3,159,610
POLYMERIZATION OF VINYL HYDROXY COMPOUNDS WITH VINYL COMPOUNDS IN THE PRESENCE OF INHIBITING AMINES
Robert J. Slocombe and John D. Calfee, Dayton, Ohio, assignors to Monsanto Company, a corporation of Delaware
No Drawing. Filed July 27, 1961, Ser. No. 127,122
13 Claims. (Cl. 260—87.5)

This invention is directed to an improved polymerization process for copolymerization of a hydroxyl containing monomer with at least one other copolymerizable monomer which generates a halogen acid under the influence of a free radical generating polymerization catalyst.

It is an object of this invention to provide a process for copolymerizing a hydroxyl group-containing monomer and a halogen-containing monoolefinically unsaturated copolymerizable monomer, while substantially inhibiting undesired side reactions in which the hydroxyl-containing monomer is lost, by including in the polymerization mixture small amounts of side reaction inhibiting materials of the type defined below in Formulas A–C.

A particular object is to provide an efficient process for copolymerizing monomeric vinyl chloride with monomeric vinyloxyethanol (2-hydroxyethyl vinyl ether).

Hydroxyl bearing copolymers of vinyl chloride have highly desired functional properties due to the presence of limited quantities of polar and reactive hydroxyl groups. The incorporation of hydroxyl groups into vinyl chloride copolymers is utilized for alteration and improvement of certain properties of the vinyl chloride polymers, as for example: adhesiveness to surfaces; softening point; dyeability; compatability with other plastics; capability for cross-linking (which can be selectively performed at the desired time); etc.

Vinyl chloride polymers and copolymers having good mechanical and chemical properties play a significant role in the plastics industry. Vinyl chloride polymers which possess the above mentioned desirable properties and in addition contain quantities of functional hydroxyl groups are of a particular interest since they offer increased flexibility in use over the normal vinyl chloride homopolymers and copolymers. One substantial drawback in the development of these hydroxyl-bearing vinyl chloride polymers has been the inability to arrive at a one-step relatively high conversion process for incorporating the functional hydroxyl groups into the polymer.

One of the prior art methods for preparing the hydroxyl-bearing vinyl chloride polymers involves polymerizing monomeric vinyl chloride in admixture with organic vinyl esters to form a vinyl chloride-vinyl ester copolymer, and then subjecting this copolymer to a subsequent hydrolysis step whereby a portion of the ester groups are hydrolyzed to vinyl alcohol groups. In this manner the functional OH groups are incorporated into the vinyl chloride polymer, but the inclusion of the OH groups requires an additional reaction step, i.e., the hydrolysis step, wherein the degree of hydrolysis is difficult to control. Obviously such a two-step process not only consumes a good deal of time in selectively hydrolyzing the copolymerizate ester groups but also increases the cost of manufacturing the hydroxyl-bearing vinyl chloride copolymer. Frequently hydroxyl-group containing vinyl chloride polymers obtained in this fashion exhibit a yellow color and have decreased stability towards aging and oxidation.

Another prior art method for preparing hydroxyl-bearing vinyl chloride polymers involves inclusion of the hydroxyl groups during polymerization without any additional reaction step by polymerizing monomeric vinyl chloride in admixture with allyl alcohol, methallyl alcohol, or 2-butenol. This process has a disadvantage because the hydroxyl-bearing monomers do not readily enter copolymerization with vinyl chloride, and consequently the degree of copolymerization is substantially lowered due to the difficulty in getting the hydroxy monomer to copolymerize. Thus the amount of hydroxyl-bearing copolymer obtained with respect to the monomers charged is substantially below that obtainable by the previously indicated two-step process. Consequently while it is more desirable to incorporate the hydroxyl groups during polymerization, due to the extremely low conversions involved, this method is not economically acceptable.

Another, and more efficient prior art method for preparing hydroxyl group containing vinyl chloride polymers involves the copolymerization of vinyl chloride with hydroxyl-containing monomers which are partially etherified di- or poly alcohols. Of the ether-alcohol monomers which have been tried the hydroxyl-containing vinyl ethers have proven most suitable for copolymerization with vinyl chloride. This last mentioned process produces hydroxyl-bearing vinyl chloride copolymers having excellent properties; however, the process is complicated by the presence of undesired side reactions which serve to remove the hydroxyl-containing vinyl ether monomer from the reaction and prevent its copolymerization with vinyl chloride. This last mentioned method yields the hydroxyl-bearing vinyl chloride copolymers having the most desirable mechanical and chemical properties, but has not achieved wide commercial acceptance due to the low conversion rates experienced by practicing this method.

We have found that according to the present invention hydroxyl-bearing vinyl chloride copolymers can be produced at acceptable conversions by incorporating into the copolymerization mixture relatively small amounts of side reaction inhibitors, which function to prevent undesired dissipation of the hydroxyl-containing vinyl ether monomer and allow it to readily copolymerize with vinyl chloride while at the same time allowing the polymerization procedure to take place at a good rate of speed and in a good yield.

In the last mentioned prior art method of preparing hydroxyl-bearing vinyl chloride polymers of excellent properties, certain vexing problems occur in copolymerizing the monomeric vinyl chloride with the hydroxy, vinyl-containing monomers. The hydroxy-containing vinyl ether monomer which demonstrates the best capability for copolymerization with vinyl chloride is vinyloxyethanol (hereinafter referred to as VOE).

While the exact nature of the problem, viz, loss of VOE monomer, is not fully understood, one of the factors known to be involved is the internal cyclization of VOE to an undesired by-product, methyldioxolane (2-methyl-3,3-dioxolane). It has been evident in multicomponent polymerization runs that during copolymerization of vinyl chloride with VOE a large portion of the VOE was cyclized to methyldioxolane and effectively lost in this manner. It is not unusual to lose 25 to 30% or more of the expensive VOE monomer due to internal cyclization. Another problem which may cause loss of VOE monomer is "head to tail" delinquent reaction of the VOE monomer. By "head to tail" delinquent reaction is meant the reaction caused by which the hydroxyl group of one VOE molecule reacts with the olefinic bond in the vinyl portion of an adjacent molecule of VOE to yield a VOE homopolymer having the structure of a polyacetal. This reaction of course prevents inclusion of the VOE into the vinyl chloride-VOE copolymer chain. This "head to tail" type of reaction wherein the hydroxyl group attacks the double bond of the vinyl group can also be a factor in vinyl chloride copolymerization with hydroxyl containing monomers other than VOE. In addition to this there is a possibility that although some of the VOE enters into copolymerization with the vinyl chloride monomer, this same side reaction can involve the side chain hydroxyl group of a molecule of the now copolymerized VOE to cause a side chain polyacetal formation. This side chain polyacetal formation increases the VOE side chain length without increasing the molar concentration of functional hydroxy groups, and therefore tends to diminish not only the efficiency of the polymerization process, but also the functionality and reactivity of the copolymer composition. Of course the side chain build-up is undesired for most purposes since it constitutes a waste of the expensive hydroxyl-containing monomer and thus prevents incorporating more VOE into the polymer backbone. This side chain reaction of copolymer pendant hydroxyl groups can also introduce problems in the preparation of copolymers formed from more than two monomers. Side chain esterifications can thus readily take place during copolymerization when preparing terpolymers where one of the monomeric ingredients contains a functional carboxyl group. In such a case the pendant hydroxyl group of the already copolymerized VOE monomer reacts with the carboxyl group of the acid monomer (which is not yet incorporated into the polymer back bone chain) to form a side chain esterification which completely precludes further reactivity of any such pendant hydroxyl groups. Of course this is highly undesired in as much as the terpolymer thus prepared is relatively incapable of cross-linking in the desired manner at the desired time and has little or no functionality due to the consumption of the reactive hydroxyl groups. It is highly desired in the synthesis of hydroxyl-bearing copolymers (including of course ternary polymers, tetra polymers, etc.) to preserve the functionality of the hydroxyl groups on the polymer side chains. The preservation of the hydroxyl functionality of vinyl chloride/vinyloxyethanol copolymers is quite important as it is this functionality which renders these polymers eminently suitable for: subsequent reactions; adhesive affinity to glass and other siliceous and calcareous surfaces, and metal surfaces; the dyeability of these copolymers, etc.

Thus a real and urgent need exists in the art for the development of a process wherein these side reactions are substantially inhibited, yet the copolymerization between the vinyl halide monomer and the hydroxyl-containing monomer is still allowed to proceed at a good rate. This requirement is, of course, also present in the preparation of ternary and tetra polymers of vinyl chloride and VOE with one or more additional monomeric components as otherwise the ternary and tetra polymers will be subect to "spontaneous" cross-linking during synthesis.

These objectives have been accomplished admirably in the present invention by the use of cyclization inhibitors which are nitrogen containing compounds of a "non-aromatic" nature and selected from the group of structures consisting of:

(A) 

wherein the substituents $R_1$, $R_2$, and $R_3$ are selected from the group consisting of: hydrogen, lower alkyl, and N,N-di-lower alkyl carbimide radicals of the structure

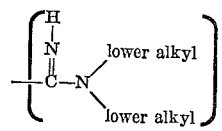

with the proviso that when one of the substituents $R_1$, $R_2$, and $R_3$ is an N,N-di-lower alkyl carbimide, the other substituents are selected from the group consisting of hydrogen and lower alkyl;

(B) 

wherein Z is a residue selected from the group consisting of: (1) staturated heterocyclic residues having the structure

wherein X is an element selected from the group consisting of: carbon, oxygen and sulfur, and (2) unsaturated hydrocarbon residues having the structure

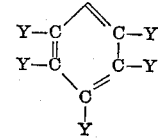

wherein Y is selected from the group consisting of hydrogen and lower alkyl; and organic quaternary ammonium bases having a cation of the structure (C) 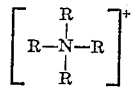

wherein the R substituents are selected from the group consisting of: lower alkyl and aralkyl; and an anion of the structure $$-[O-R']$$

wherein R' is a substituent selected from the group consisting of: hydrogen and lower alkyl.

Compounds embraced within structure (A) 

are primary aliphatic amines, secondary aliphatic amines, tertiary aliphatic amines, and lower alkyl-substituted guanidines. In the case of the primary aliphatic amines $R_1$ is a lower alkyl group and the substituents $R_2$ and $R_3$ are both hydrogen.

In the primary aliphatic amines the lower alkyl group can be methyl; ethyl; n-propyl; isopropyl; n-butyl; secondary butyl; iso-butyl; tertiary butyl; n-amyl; n-hexyl; etc. Various isomers of the 5 carbon and 6 carbon lower alkyl substituents can, of course, be used as the $R_1$ substituent in the primary aliphatic amine. E.g., 1-methyl-n-butyl amine; 1,1-dimethyl-n-propyl amine; 1,2-dimethyl-n-propyl amine; 2,2-dimethyl-n-propyl amine; 1-ethyl-n-propyl amine; 1-methyl-n-amyl amine; 1,1-dimethyl-n-butyl amine; 1,2-dimethyl-n-butyl amine; etc. can be listed as suitable primary aliphatic amines wherein the alkyl substituent $R_1$ contains 5 to 6 carbon atoms. The term "lower alkyl" as used throughout this application is intended to denote alkyl groups having 1 to 6 carbon atoms, and is thus in accord with the standard definition of "lower alkyl."

Also included with the structure (A) above, are the secondary aliphatic amines. In these compounds both $R_1$ and either $R_2$ or $R_3$ are lower alkyl groups, while the residual substituent is hydrogen. In like manner to the above indicated definition of primary aliphatic amines the two lower alkyl substituents can be any of the substituents set forth above in connection with the definition of $R_1$. As exemplary compounds falling within the definition of secondary aliphatic amines the following can be listed; dimethylamine; diethylamine; di-n-butylamine; di-n-propylamine; di-amylamine; di-hexylamine; etc.

Tertiary aliphatic amines wherein all the substituents $R_1$, $R_2$ and $R_3$ are lower alkyl groups are also included within the purview of Formula A above. Of course the lower alkyl substituents can be any one of the substituents referred to in conjunction with the substituent $R_1$ as previously defined. The compounds, trimethylamine; methyldiethylamine; triethylamine; tripropylamine; propyldibutylamine; tributylamine; ethyldibutylamine; triamylamine; and trihexylamine, etc., are examples of tertiary aliphatic amines as included in Formula A above.

The structure of Formula A also encompasses lower alkyl substituted guanidines. These lower alkyl substituted guanidine compounds are essentially tertiary amines wherein one of the substituents $R_1$, $R_2$, and $R_3$ is an N,N-di-lower alkyl carbimide of the structure:

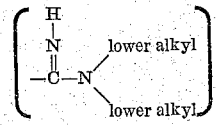

while the other two substituents can be either hydrogen or lower alkyl. As noted in this structure, both substituents on the carbimide structure are lower alkyl groups which can be any one of the substituents mentioned previously with respect to substituent $R_1$ of structure (A). Assuming that $R_2$ is a carbimide substituent, then both $R_1$ and $R_3$ can be either hydrogen or lower alkyl; and of course if $R_3$ be the carbimide substituent, then $R_1$ and $R_2$ can be likewise either hydrogen or lower alkyl. There is preferably only one N,N-di-lower alkyl alkylated carbimide substituent on the centrally located nitrogen atom as shown in structure (A) above. As exemplary of these lower alkyl substituted guanidine compounds the following may be listed: N,N-dimethyl guanidine; tetramethyl guanidine; tetraethyl guanidine; tetrapropyl guanidine; tetrabutyl guanidine; tetraamyl guanidine; tetrahexyl guanidine; etc.

Structural formula (B) 

relates to nitrogen-containing heterocyclic compounds having 6 membered rings, and broadly includes the pyridines; piperidines; lower alkyl substituted pyridines; morpholines, thiomorpholines, etc. As shown above the compounds included within the purview of structure (B) are indicated wherein Z is essentially either a saturated heterocyclic residue or an unsaturated hydrocarbon residue. In the saturated heterocyclic compounds wherein X is an element selected from the group consisting of carbon, oxygen and sulfur; the piperidines, morpholines, and thiomorpholines are included. In the unsaturated hydrocarbon residue compounds, the pyridines and lower alkyl substituted pyridines are included.

As examples of compounds coming within structural Formula B, piperidine, morpholine, thiomorpholine, pyridine, and mono-, di-, tri-, tetra-, and penta-, lower alkyl-substituted pyridines can be cited.

Structural Formula C shown above is directed to organic quaternary ammonium bases wherein the cationic portion of the compound is a tetra hydrocarbon-substituted ammonium. The R substituents can be either lower alkyl or aralkyl. When the substituents are lower alkyl they can be any of the lower alkyl substituents mentioned above in conjunction with substituent $R_1$ of structural Formula A. Suitable aralkyl substituents include those wherein the benzene ring is separated from the nitrogen atom of the cation by at least one ($CH_2$) group. The number of ($CH_2$) groups which are intermediate the nitrogen atom and the benzene ring can conveniently be an integer of from one to three. The anionic portion of these organic quaternary ammonium bases can be either hydroxide or lower alkyloxides. The following compounds can be listed as exemplary organic quaternary ammonium bases included within the purview of the above formula C: benzyltrimethyl ammonium hydroxide; benzyltriethyl ammonium hydroxide; benzyltributyl ammonium ethoxide; benzyltri-n-propyl ammonium hydroxide; benzylethyldiisopropyl ammonium butoxide; benzylmethyldiisobutyl ammonium hydroxide; benzylethyldimethyl ammonium propoxide; benzyltriallyl ammonium hydroxide; dibenzyldimethyl ammonium methoxide; dibenzyldiethyl ammonium methoxide; dibenzyldibutyl ammonium hydroxide; tetramethyl ammonium methoxide; tetramethyl ammonium hydroxide; tetraethyl ammonium ethoxide; methylethyldibutyl ammonium hydroxide; demethyldiethyl ammonium propoxide; dimethyldiethyl ammonium hydroxide; butyltriethyl ammonium butoxide; diisopropyldimethyl ammonium hydroxide; tetra-n-butyl ammonium methoxide; hexyl-trimethyl ammonium methoxide; etc.

It will be apparent from structural Formulas A, B, and C, that in each case the carbon atom which is joined directly to nitrogen is "non-aromatic" in nature. This is very important since aromatic amines do not function to yield the combined advantageous results of preventing the side reaction loss of the hydroxyl containing monomer while at the same time allowing copolymerization to proceed at an acceptable rate. It should also be observed here that the substituents which are directly bonded to nitrogen should not contain functional groups, and such compounds are to be likewise avoided. They do not perform in the desired manner to secure the combined advantageous results of the three classes of compounds depicted in structural Formulas A, B, and C. Thus such compounds as anilines (primary aromatic amines), dimethylanilines (tertiary mixed aromatic aliphatic amines), methylenedianilines (primary aromatic diamines), para-hydroxydiphenyl amines (hydroxy substituted secondary aromatic amines), para-toluidines (ring alkylated aromatic amines) and other related compounds either do not have any substantial beneficial effect whatsoever upon the loss of vinyloxyethanol monomer due to side reactions, and/or they substantially reduce the conversion of the copolymerization reaction. For this reason the use of inhibitor compounds wherein a ring (aromatic) carbon atom is directly bonded to nitrogen, is to be avoided in the practice of the instant invention. The sharp contrast between the side reaction inhibiting compounds falling within structural Formulas A, B and C and the compounds which are to be avoided, i.e. aromatic amines, in their combined effect of prevention of vinyloxyethane loss due to side reactions, e.g., cyclization, and conversion rates during copolymerization will become clearly evident in the table presented hereinbelow.

While the invention will be more specifically illustrated for copolymerization runs involving vinyl chloride-vinyloxyethanol (two component polymerization) and vinyl chloride - vinyloxyethanol - dibutylfumarate (three component polymerization), these multicomponent polymerization systems merely provide an illustrative environment in which the side reaction inhibitors of the present invention are shown to achieve their combined desired results, viz, substantially inhibiting monomer loss by preventing side reactions of the hydroxyl-containing monomer while allowing polymerization to proceed at an acceptable rate. The invention is equally applicable to the copolymerization of other vinyl halides and other hydroxyl-containing copolymerizable monomers as well. In fact the instant invention is applicable to improve hydroxyl monomer loss in copolymerization processes wherein hydroxyl-bearing copolymers are prepared by copolymerization of a hydroxyl containing copolymerizable monomer with at least one other copolymerizable monomer when the other copolymerizable monomer generates a halogen acid under the influence of a free radical-generating polymerization catalyst. The invention will be further illustrated by the example which follows. In this example the percentages given are percentages by weight unless otherwise indicated.

EXAMPLE (COPOLYMERIZATION)

To stainless steel bombs were charged monomer mixtures of vinyl chloride, vinyl oxyethanol (2-hydroxyethyl vinyl ether), and dibutyl fumarate (where indicated in the table) of the percentage constitution indicated below. Small amounts (0.07 to 2.0% by weight based on total monomer input) of side reaction inhibitors were included in the copolymerization mixture along with about 0.15% by weight of the total monomer charge of a free radical generating polymerization catalyst, azobisisobutyronitrile. The bombs were then sealed, placed in an autoclave and heated to about 60° C. at autogenous pressure. The copolymerization reaction was allowed to proceed under these conditions for two hours. Then the autoclave was opened and the bombs were cooled to about −20° C. and opened. The contents of the bombs were then transferred to a receptacle containing a solution of petroleum ether ("Skellysolve F"). In place of the petroleum ether solution a solution of methanol can be employed as precipitant.

The vinyl chloride-vinyloxyethanol-dibutyl fumarate and vinyl chloride-vinyloxyethanol copolymers precipitated immediately and were allowed to stand over night. The residual petroleum ether solution was decanted off, and passed through a filter.

The vinyl chloride-vinyloxyethanol-dibutyl fumarate and vinyl chloride-vinyloxyethanol copolymers were collected and washed several times with fresh petroleum ether and then vacuum dried for 48 hours at 42° C.

The decanted petroleum ether solution containing the side-reaction by-products was collected, and cyclohexane solution was added thereto as an internal standard for vapor phase chromatographic analysis to determine the percentage of the vinyloxyethanol monomer which was lost due to internal cyclization to methyl dioxolane (2-methyl-1,3-dioxolane). Then this decanted petroleum ether solution containing cyclohexane was subjected to vapor phase chromatographic analysis to give the below indicated percentages of vinyloxyethanol lost due to methyldioxolane formation. The "control" runs contained no side reaction inhibitor, but all runs were otherwise run under identical conditions.

The "VOE Converted to Methyldioxolane" is a weight percent based on the weight of VOE charge.

Both "Percent Decrease in VOE Loss" and "Percent Increase in Conversion to Copolymer" are comparative percentages wherein the "Percent VOE Converted to Methyldioxolane" and "Percent Conversion to Copolymer" values obtained in the runs employing side reaction inhibitors are expressed in percentages based upon comparison with the corresponding values obtained from the respective control, which was subjected to exactly the same copolymerization conditions but did not contain an inhibitor. The "Percent Decrease . . ." and "Percent Increase . . ." of Runs 2–20 are based upon the values for the control "Run 1," and Runs 22–24 are based upon the values secured in control "Run 21."

As previously mentioned the side reaction inhibitors of this invention are "non-aromatic," viz., in all three of the structural Formulae A to C as shown previously, the nitrogen atom is never bonded directly to an aromatic carbon atom (a carbon atom which forms a part of a benzene ring).

To illustrate the sharply contrasting and disadvantageous results obtained by deviating from this norm, Runs 17–20, 23, and 24 have been included herein. These runs show the behavior of several aromatic amines and their propensity for severely hindering the progress of the copolymerization process. This disadvantageous feature is reflected in the prohibitively low conversion values obtained with their use. Thus while in most cases the aromatic side reaction inhibitors do decrease the VOE loss as compared to the respective control, they also inhibit polymerization so severely that they cannot be satisfactorily employed. This concomitant inhibition of polymerization also applies to "aromatic" side reaction inhibitors which possess substitution of various groups on the benzene ring, e.g., p-toluidine (ring alkylated primary aromatic amine), and p-hydroxydiphenylamine (hydroxy secondary aromatic amine) are likewise unsuitable.

The "non-aromatic" side reaction inhibitors of the present invention as defined in the structural Formulas A–C, when used in sufficient amounts, not only substantially

*Table (Copolymerization)*

| Run No. | Monomer Ratio, percent VCl/VOE/DBF | Side Reaction Inhibitor | Inhibitor, percent Concentration | Percent VOE Converted to Methyldioxolane | Percent Conversion to Copolymer | Percent Decrease in VOE Loss | Percent Increase in Conversion to Copolymer |
|---|---|---|---|---|---|---|---|
| 1 (control) | 85/10/5 | | 0.00 | 25.0 | 10.4 | 0.00 | 0.00 |
| 2 | 85/10/5 | Triethylamine | 0.10 | <1.8 | 21.7 | 92.8 | 108.6 |
| 3 | 85/10/5 | ...do... | 0.15 | trace | 19.3 | >98.0 | 85.6 |
| 4 | 85/10/5 | Tetramethyl Guanidine | 0.07 | 19.0 | 28.4 | 24.0 | 173.0 |
| 5 | 85/10/5 | ...do... | 0.14 | 0.0 | 16.2 | 100.0 | 55.8 |
| 6 | 85/10/5 | Dibutylamine | 0.10 | 24.0 | 36.3 | 4.0 | 249.0 |
| 7 | 85/10/5 | ...do... | 0.15 | trace | 17.6 | >98.0 | 69.2 |
| 8 | 85/10/5 | n-Hexylamine | 0.10 | 8.3 | 30.1 | 66.8 | 189.4 |
| 9 | 85/10/5 | ...do... | 0.20 | 0.0 | 15.1 | 100.0 | 45.2 |
| 10 | 85/10/5 | Benzyltrimethyl-ammonium methoxide | 0.05 | 28.0 | 34.5 | −12.0 | 231.7 |
| 11 | 85/10/5 | ...do... | 0.15 | 12.0 | 15.9 | 52.0 | 52.9 |
| 12 | 85/10/5 | Pyridine | 0.20 | 18.0 | 14.1 | 28.0 | 35.6 |
| 13 | 85/10/5 | ...do... | 0.50 | 13.0 | 27.4 | 48.0 | 163.5 |
| 14 | 85/10/5 | ...do... | 1.00 | 4.3 | 20.4 | 82.8 | 96.2 |
| 15 | 85/10/5 | ...do... | 1.50 | 4.5 | 16.6 | 82.0 | 59.6 |
| 16 | 85/10/5 | ...do... | 2.00 | 2.8 | 15.1 | 88.8 | 45.2 |
| 17 | 85/10/5 | Methylene-dianiline | 0.5 | 3.1 | 1.5 | 87.6 | −85.6 |
| 18 | 85/10/5 | ...do... | 1.0 | 1.8 | 2.2 | 92.8 | −78.8 |
| 19 | 85/10/5 | Dimethyl aniline | 0.5 | 15.0 | 3.2 | 40.0 | −69.2 |
| 20 | 85/10/5 | ...do... | 1.0 | 27.0 | 1.2 | −8.0 | −88.5 |
| 21 (control) | 80/20/0 | | 0.00 | 18.4 | 27.0 | 0.00 | 0.00 |
| 22 | 80/20/0 | Triethylamine | 0.15 | 0.00 | 19.7 | 100.0 | −27.0 |
| 23 | 80/20/0 | Aniline | 0.50 | 6.0 | 1.9 | 67.4 | −92.9 |
| 24 | 80/20/0 | ...do... | 1.00 | 4.0 | 1.5 | 78.3 | −94.4 |

VCl = vinyl chloride.   VOE = vinyloxyethanol.   DBF = dibutyl fumarate.

In the multicomponent polymerization table shown above:

Monomer ratio percent is percent by weight, with Runs 1–20 involving three component copolymerization and Runs 21–24 involving two component copolymerization.

Both "Inhibitor Percent Concentration" and "Percent Conversion to Copolymer" are weight percents based on weight of total monomer charge.

inhibit the side reaction losses of the hydroxy-containing monomer, but also allow the polymerization to proceed at an acceptable rate of speed. In fact in many cases the addition of the side reaction inhibitors of the instant invention vastly improve upon the conversions to copolymer as compared with control runs performed under exactly the same polymerization conditions. This conversion improvement is especially noticeable in the copolymerization runs wherein three monomer components are employed.

For example Run No. 2 which contains triethylamine substantially reduces VOE cyclization loss (92.8% decrease as compared to the control) yet allows polymerization to proceed at more than double the conversion (108.6% increase as compared to the control) attainable where no side reaction inhibitor is employed. Run No. 18 which contains methylene dianiline (an aromatic amine) required six times the amount of amine compared to Run No. 2 to attain the same reduction in VOE loss (92.8% decrease as compared to the control), yet demonstrated an inhibitory effect on the polymerization process (reduction in conversion of about 78% as compared to the control). Run No. 2 showed a conversion to copolymer of roughly ten times that attainable in Run No. 18 upon comparison of the two conversions.

Run No. 13 containing pyridine and Run No. 19 containing dimethylaniline (tertiary mixed aromatic-aliphatic amine) were both used in the same concentration (0.5% by wt. of total monomer charge), and gave roughly comparable reductions in VOE monomer loss of 48% and 40% respectively (as compared to the control). However, Run No. 13 showed increased conversion to copolymer by about 163% while Run No. 19 exhibited a decreased conversion of about 69% when the conversions of both runs were compared to their control. Run No. 13 showed a conversion to copolymer (27.4%) which is in excess of an eight fold increase over that secured in Run 19 (3.2%) upon direct comparison of these two runs.

In general, as will be apparent from the above "table," the addition of the side reaction inhibitors of Formulas A to C of this invention will serve not only to maintain polymerization at an acceptable rate but also markedly improve on the conversion attained in the polymerization processes which employ no inhibitors, while at the same time causing a substantial diminution, if not complete elimination of hydroxy-monomer losses.

In some cases, however, the presence of the inhibitors of the instant invention may tend to yield conversions slightly below those attainable in the absence of said inhibitors, but the polymerization process still proceeds at an acceptable conversion rate while effecting substantial decreases in loss of hydroxy containing monomer. For example on a percent conversion to copolymer basis (based on total monomer charge) triethylamine (Run No. 22) shows a percent conversion only about 7% below that of its control (Run No. 21) while it completely eliminates VOE cyclization.

Another example of somewhat reduced conversion resulted from runs wherein an 80/20 (monomer ratio weight percent) mixture of vinyl chloride-vinyloxyethanol was copolymerized in the presence of 0.15% (by weight of total monomer charge) of azobisisobutyronitrile and containing 0.5 to 1.0% (by weight of total monomer charge) of piperidine. These polymerizations were carried out in the same manner and under the same conditions as described in the previous example. The loss of hydroxy-containing monomer was completely eliminated although the conversions attained (5.2–5.3% by weight of total monomer charge) were below that achieved in control Run No. 21. It is quite possible that too high a concentration of piperidine was employed, and the use of lower concentrations, e.g., 0.1 to 0.2% by weight of total monomer charge, would probably result in increased conversions. These conversions still evidenced approximately a three fold increase over those attainable in Runs 23–24, which contained aniline and exhibited a loss of VOE averaging 5%.

HYDROXYL-CONTAINING MONOMER

The present invention is widely applicable to the multi-component polymerization of monoolefinically unsaturated hydroxyl-containing monomers capable of free radical-initiated copolymerization with one or more monoolefinically unsaturated comonomers especially when at least one of the comonomers is a halogen-containing monomer. Any hydroxy-containing monomer which contains only carbon, hydrogen, and oxygen, and contains no functional groups other than hydroxyl, ether, carboxyl, ester, and olefin groups can be employed as long as it is capable of copolymerization under free radical-initiated catalysis. Those copolymerizable hydroxy group-containing monomers which are classified as either: (1) partially etherified polyols containing monoolefinically unsaturated ether groups, or (2) partially esterified lower alkyl polyols containing monoolefinically unsaturated ester groups are especially suitable for use in the process of the present invention.

Suitable unsaturated partially etherified lower alkyl polyols are those of the formula:

R—O—R'—OH wherein R is a monoolefinically unsaturated group selected from the group consisting of vinyl, allyl, isopropenyl, methallyl and 2-butenyl, and R' is a saturated divalent organic radical, particularly a divalent hydrocarbon or oxohydrocarbon radical. Examples of these hydroxy monomers are: the vinyl, allyl, methallyl, and 2-butenyl ethers of ethylene glycol, di-ethylene glycol, polyglycol, glycerin, pentaerythritol, butanediol, hexanediol, etc.

Suitable partially esterified lower alkyl polyols of unsaturated acids are those of the formula:

$$R°—CH=C(R)\overset{O}{\overset{\|}{C}}—O—R'—OH$$

wherein R° is selected from the group consisting of hydrogen, methyl, carboxyl, and carboxyalkyl. Of course, the term "alkyl" as used in "carboxyalkyl" is intended to include aralkyl groups, e.g., benzyl. R is selected from the group consisting of hydrogen and methyl, and R' is a saturated divalent organic radical. Examples of these hydroxy monomers are: the partial esters of any of the above named polyols with α,β-unsaturated acids such as acrylic acid, α-alkyl substituted acrylic acids (esp. methacrylic acid), crotonic acid, maleic acid, fumeric acid, etc. The preparation of these monomers is accomplished by procedures known in the prior art.

NON-HYDROXYL-CONTAINING COMONOMERS

Any of the above hydroxy-bearing monomers can be copolymerized with one or more comonomers as long as the individual comonomer is both monoolefinically unsaturated and capable of undergoing free radical-initiated copolymerization.

Those monoolefinically unsaturated free radical-initiated copolymerizable monomers which generate a halogen acid under the influence of a free radical-initiating polymerization catalyst are especially suitable for use in the present invention. Such monomers include: the vinyl halides, vinyl chloride, vinyl bromide, and vinyl fluoride; vinylidene chloride, vinylidene bromide, and vinylidene fluoride; mono- and di-chloro-polyhalogenated olefins, e.g., mono-chlorodifluoroethylene, mono-chlorotrifluoroethylene, di-chloro-di-fluoroethylene, etc.; tetra-halogenated olefins with the same halogen substituents, e.g., tetrachloroethylene, tetrafluoroethylene, etc.

Another suitable group of monoolefinically unsaturated comonomers are the linear and branched chain hydrocarbon olefin monomers having 2–6 carbon atoms, such as ethylene, isobutylene, etc.

The mono- and di-alkyl esters of fumaric acid are eminently suitable for employment as non-hydroxy co-monomers in accordance with the present invention especially in forming terpolymers where the additional co-monomer is a vinyl halide or vinylidene halide. Those fumarate esters of the formula:

ROOC—CH=CH—COOR' wherein R is an alkyl substituent having 1–20 carbon atoms, and R' is selected from the group consisting of hydrogen, alkyl substituents having 1–20 carbon atoms, and monocyclic aryl substituents having 7–10 carbon atoms, can be used as non-hydroxy comonomers according to the instant invention. Examples of these monomers include: dimethyl fumarate; di-ethyl fumarate; di-butyl fumarate; di-hexyl fumarate; di-decyl fumarate; di-dodecyl fumarate; mono-decyl fumarate; mono-dodecyl fumarate; monostearyl fumarate; mono-butyl fumarate, mono-octyl fumarate, mono-hexyl fumarate; ethyl butyl fumarate; ethyl octyl fumarate; butyl hexyl fumarate; butyl octyl fumarate; butyl benzyl fumarate; ethyl benzyl fumarate; propyl benzyl fumarate; methyl benzyl fumarate; etc. In the case of fumarate diesters where R' is an alkyl substituent the R and R' substituents in the preceding formula can be the same or different alkyl groups. When the alkyl groups are different, mixed di-alkyl fumarate esters are the result, and, of course, these mixed fumarate esters are quite suitable for use as comonomers in the improved polymerization process of this invention.

Other comonomers which can be employed include, e.g., vinyl esters, such as, vinyl acetate; vinyl propionate; vinyl hexanoate; acrylic and methacrylic acids; lower alkyl esters of acrylic and methacrylic acid, such as, ethyl acrylate; methyl methacrylate; ethyl methacrylate; propyl acrylate; propyl methacrylate; hexyl acrylate; hexyl methacrylate; etc.; acrylonitrile and methacrylonitrile; etc.

POLYMERIZATION CONDITIONS

The formation of hydroxy containing copolymers within the purview of the present invention can be accomplished by any of the known polymerization techniques. The copolymerization of the hydroxyl-containing monomer with its comonomer(s), e.g., vinyl chloride, and additional other comonomers, e.g., vinyl acetate, di-butyl fumarate, etc., can be carried out in bulk, solution, emulsion, and in aqueous or organic suspension. The activation of the polymerization process occurs by the known methods, for example, by oxygen, inorganic or organic peroxide, azo catalysts, or by the redox catalysts. Azo catalysts perform especially well in the copolymerization processes performed in accordance with the instant invention. Azo catalysts such as those shown in U.S. 2,471,959; 2,515,628; 2,520,338; 2,520,339 and 2,565,573 can be employed. To illustrate, such diverse azo catalysts as azobisisobutyronitrile; methyl azobisisobutyrate, and diethyl-2,2'-azobis-(2-methyl propionate) are useful as polymerization catalysts. Any of these or similar azo catalysts can be employed and the use of azo catalysts is preferred. Peroxy catalysts such as peroxides or percarbonates may also be used. When peroxides are employed, the use of organic peroxides is preferred as typified by di-tert.-butyl peroxide; benzoyl peroxide; lauroyl peroxide; tert.-butyl perbenzoate; etc.

One of the most common of the said techniques is mass (bulk) polymerization wherein the only materials present in the reaction mixture are the monomers themselves plus any catalyst and any modifier that may be used to effect the desired molecular weight. No added solvent or reaction medium is generally present. Suitable catalysts for the mass polymerization technique are those which promote generation of free radicals, e.g., peroxide and azo catalysts. By way of example are benzoyl peroxide; di-acetyl peroxide; di-methyl phenylhydroperoxy methane; α,α'-azobisisobutyronitrile; etc.

Another satisfactory polymerization technique is solvent polymerization which is similar to mass polymerization except that a solvent for the monomers is also present during the polymerization. Use of a solvent generally results in a lower molecular weight copolymer.

The formation of these hydroxyl-containing copolymers can also be effected advantageously by suspension or emulsion polymerization techniques. Both suspension and emulsion polymerization involve the use of a non-solvent for the monomers concerned, but in the suspension technique the monomer particles (and ultimately those of the polymer) are comparatively large, while in the emulsion procedure the particles are much smaller and the final product is a stable latex. A suitable method for effecting the suspension polymerization is to employ water and a small amount of an added suspending agent, such as a vinyl acetate-maleic anhydride copolymer, or certain phosphates with a lauroyl peroxide catalyst and a limited amount of an emulsifier such as glyceryl monostearate. A suitable emulsion polymerization procedure is to employ water along with potassium persulfate catalyst, any suitable emulsifier, and a polymerization modifier. Emulsion and suspension polymerizations can be effected at temperatures which are chosen in accordance with a particular catalyst used, but which may, for example, be from −100° to 200° C. and more preferably −50° to 100° C., although higher or lower temperatures can be employed, if desired.

The polymerization procedures can be conducted over a wide temperature range depending upon specific monomers chosen and the catalyst employed. The reaction can be allowed to proceed for from a few minutes to several hours or more, or even several days. When relatively unstable monomers are used, such as VCl, temperatures of about −15° C. to about 100° C. will be preferred.

The pressures which are employed during copolymerization can vary from atmospheric pressure to higher pressures such as 100,000 p.s.i. The lower pressures will generally be employed, e.g., from atmospheric pressure to approximately 300 p.s.i. in the copolymerization procedures which are known in the art as "low pressure" polymerizations. In "high pressure" polymerizations, pressures of about 300 p.s.i. to about 100,000 p.s.i. or even higher are usually employed, and the benefits which accompany the practice of the present invention are attainable both by low pressure and high pressure copolymerization procedures. The high pressure copolymerization procedure is in fact preferred for some of the copolymerization processes, such as those wherein the hydroxyl-containing monomer (e.g., vinyl oxyethanol) is copolymerized with a straight or branched chain hydrocarbon monoolefinically unsaturated comonomer such as ethylene, propylene, butylene, isobutylene, etc., in which case pressures of about 35,000 p.s.i. will be used. Generally though the low pressure copolymerization procedures will be employed, e.g., for the copolymerization of a vinyl halide with the hydroxy containing monomer.

The hydroxyl-bearing copolymers can be prepared in a batch reaction, a series of batch reactions, or in a continuous reaction such as in a tubular reactor. Various catalysts can be used, such as for example those named above, at concentrations of about 15 to about 150 weight parts per million based on the total monomer feed.

The percent by weight in which the respective monomers are employed during the copolymerization can vary widely. Suitable monomer concentrations for use in the present invention would be, for example, 10 to 98% by weight of the halogen containing monoolefinically unsaturated monomer (e.g., vinyl chloride or vinylidene chloride); 2 to 90% by weight of hydroxyl-containing copolymerizable monomer (e.g., vinyl oxyethanol); and 0 to 50% by weight of an additional comonomer (e.g., dibutyl fumarate). When the copolymerization process involves the use of more than one comonomer in addition to the hydroxyl-containing monomer, copolymers having more than two monomeric components are secured, e.g., terpolymer, tetrapolymers, etc. Generally it will be preferred to employ the halogen-containing monoolefinically unsaturated copolymerizable comonomer in at least 50% by weight and more preferably at least 70% by weight. The hydroxyl-containing monomer will ordinarily be employed in amounts of 5% to 30% or so by weight, such as illustrated in Runs 1 to 24 in the preceding table.

When it is desired to prepare ternary polymers, tetrapolymers, etc.; the additional comonomer will generally be used in amounts of 2 to 20% by weight based upon total monomer feed, and the fumaric ester monomers are especially preferred in this regard as they tend to produce polymers which are quite stable towards aging, oxidation, and premature undesired internal cross-linking.

Ternary polymer compositions formed by the copolymerization of vinyl chloride, vinyloxyethanol, and mono and di-hydrocarbon fumarates, e.g., dibutyl fumarate, form the subject matter of a copending application, Serial No. 127,123, filed July 27, 1961, on even date herewith. Said ternary polymers can be employed as coating compositions, adhesives, etc., and demonstrate tenacious adhesion to glass and metal surfaces. Said terpolymers also yield fire resistant polyurethane foams when reacted with an organic diisocyanate, e.g., toluene diisocyanate.

The hydroxyl-containing copolymers produced by the method of the present invention are functional in nature and possess marked utility as adherent coating compositions.

While the invention has been described herein, with particular reference to various preferred embodiments thereof, it will be appreciated that variations from the details given herein can be effected without departing from the invention in its broadest aspects. It is to be understood therefore that changes and variations can be made without departing from the spirit and scope of the invention.

We claim:

1. In a polymerization process for the preparation of hydroxyl-containing copolymers wherein a hydroxyl-containing copolymerizable monomer selected from the group consisting of (1) partially etherified polyols containing monoolefinically unsaturated ether groups and having the structure, R—O—R'—OH, wherein R is a monoolefinically unsaturated group selected from the group consisting of vinyl, allyl, isopropenyl, methallyl, and 2-butenyl and R' is a radical selected from the group consisting of saturated divalent hydrocarbon and oxahydrocarbon radicals and (2) partially esterified lower alkyl polyols of the structure, $$R°—CH=C(R)\overset{O}{\overset{\|}{C}}—O—R'—OH$$

wherein R° is selected from the group consisting of hydrogen, methyl, carboxyl and carboxyalkyl, R is selected from the group consisting of hydrogen and methyl, and R' is a radical selected from the group consisting of saturated divalent hydrocarbon and oxahydrocarbon radicals, is copolymerized with at least one other copolymerizable monomer selected from the group consisting of vinyl halides, hydrocarbon olefins of 2 to 6 carbon atoms, alkylfumarates, vinyl esters of lower alkanoic acids and lower alkyl ester of acrylic and methacrylic acids under the influence of a free radical generating polymerization catalyst, the improvement which comprises performing the polymerization of the monomers in contact with a compound having the structure selected from the group consisting of:

(A) 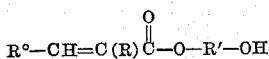

wherein the substituents, $R_1$, $R_2$, and $R_3$ are selected from the group consisting of: hydrogen, lower alkyl, and N,N-di-lower alkyl carbimide radicals of the structure

with the proviso that when one of the substituents $R_1$, $R_2$, and $R_3$ is an N,N-di-lower alkyl carbimide, the other substituents are selected from the group consisting of hydrogen and lower alkyl;

(B) 

wherein Z is a residue selected from the group consisting of: (1) saturated heterocyclic residues having the structure

wherein X is an element selected from the group consisting off: carbon, oxygen and sulfur, and (2) unsaturated hydrocarbon residues having the structure

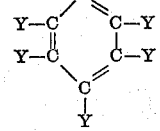

wherein Y is selected from the group consisting of hydrogen and lower alkyl; and (C) organic quaternary ammonium bases having a cation of the structure

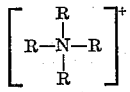

wherein the R substituents are selected from the group consisting of: lower alkyl and aralkyl, and an anion of the structure

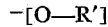

wherein R' is a substituent selected from the group consisting of: hydrogen and lower alkyl.

2. The polymerization process of claim 1 wherein the hydroxyl-containing copolymerizable monomer is vinyloxyethanol.

3. The method of claim 1 wherein the other monomer is vinyl chloride.

4. The method of claim 3 wherein the hydroxyl-containing copolymerizable monomer is vinyloxyethanol.

5. The method of claim 1 wherein the other monomer is employed in at least 50% by weight of the total monomers charged.

6. The method of claim 5 wherein the free radical generating catalyst is an azo catalyst.

7. The method of claim 6 wherein the azo catalyst is azobisisobutyronitrile.

8. The method of claim 1 in which the inhibiting compound is a trialkyl amine in which the alkyl groups are lower alkyl groups.

9. The method of claim 1 in which the inhibiting compound is triethylamine.

10. The method of claim 1 in which the inhibiting compound is pyridine.

11. The method of claim 1 in which the hydroxyl-containing monomer is a vinyl ether of a glycol and the other monomer is vinyl chloride.

12. The process of copolymerizing vinyl chloride with vinyloxyethanol by interacting a mixture of the said monomers containing at least 50% by weight vinyl chloride at temperatures of —15 to 100° C. under the influence of a free radical catalyst and in contact with a side reaction inhibiting compound consisting of a trialkyl amine in which the alkyl groups are lower alkyl groups.

13. The process of claim 12 in which the trialkyl amine is triethylamine.

References Cited in the file of this patent

UNITED STATES PATENTS

| | | |
|---|---|---|
| 1,959,927 | Reppe | May 22, 1934 |
| 2,529,315 | Serniuk | Nov. 7, 1950 |
| 2,694,053 | Uraneck | Nov. 9, 1954 |
| 2,911,398 | Vandenberg | Nov. 3, 1959 |
| 2,979,491 | Piloni | Apr. 11, 1961 |